Sept. 6, 1949.　　　　　L. QUIJADA　　　　　2,481,446
PIPE AND TUBE CUTTER
Filed Dec. 15, 1947　　　　　　　　　　　2 Sheets-Sheet 2
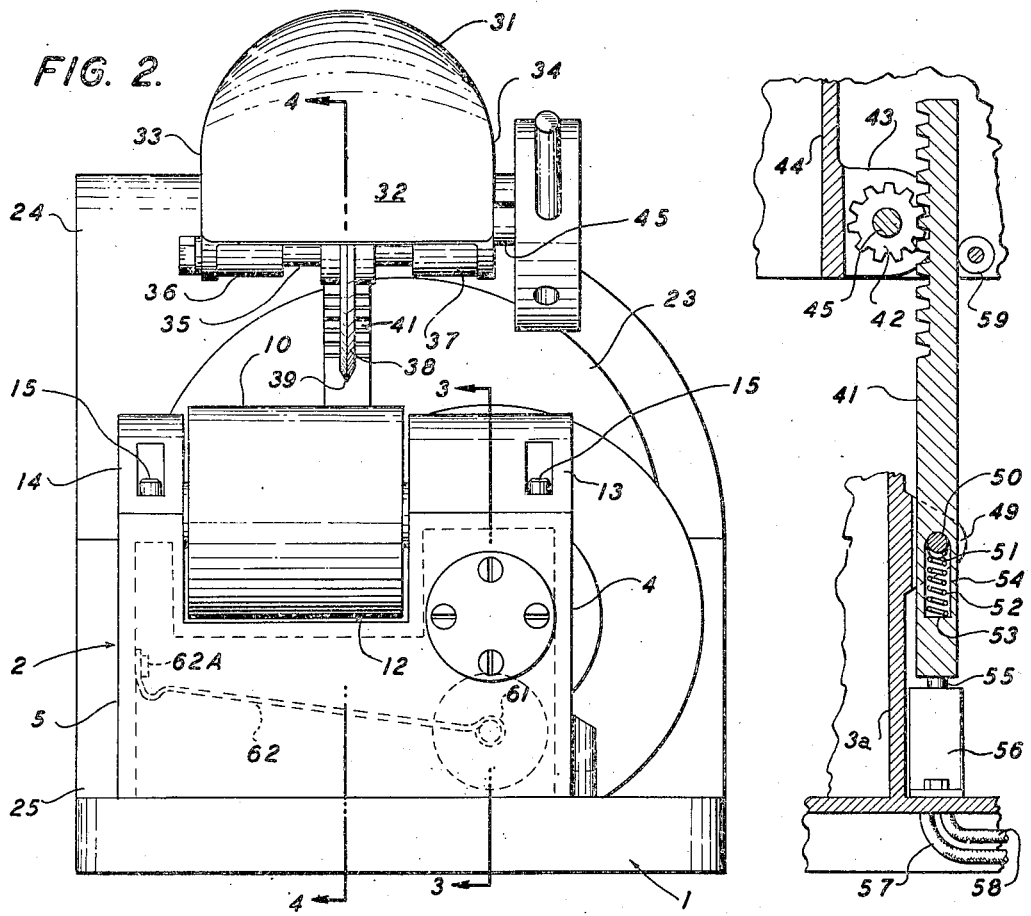
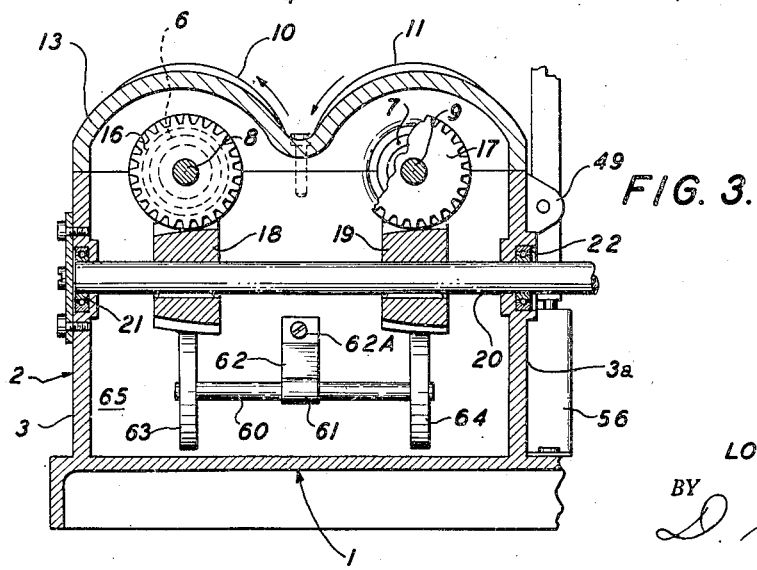
INVENTOR.
LOUIS QUIJADA
BY
D. Gordon Angus
ATTORNEY Patented Sept. 6, 1949

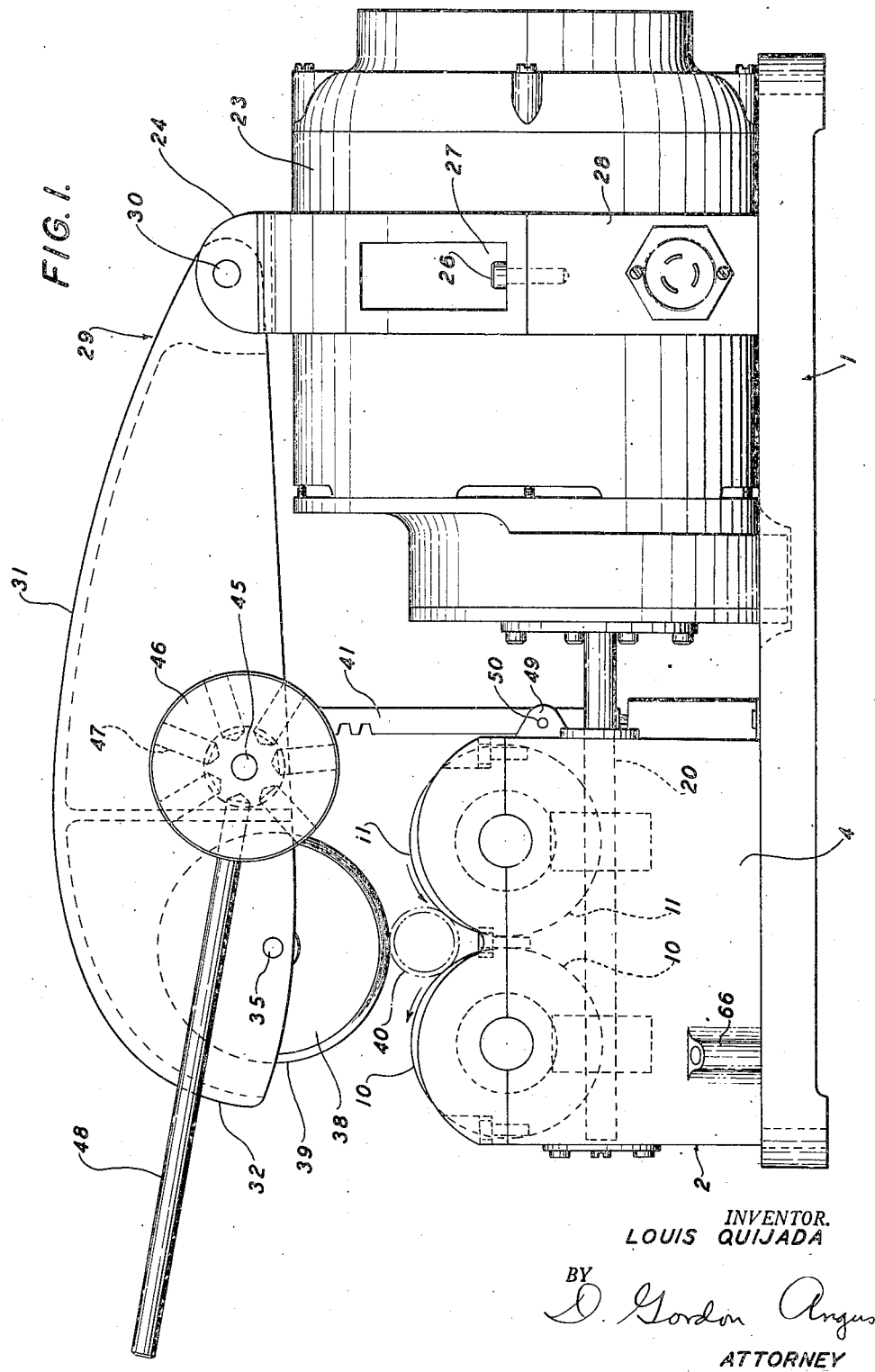

2,481,446

UNITED STATES PATENT OFFICE 2,481,446

PIPE AND TUBE CUTTER

Louis Quijada, Alhambra, Calif.

Application December 15, 1947, Serial No. 791,829

4 Claims. (Cl. 164—60)

This invention relates to pipe or tube cutting devices, and has for its principal object to provide a power-driven cutting machine of this character, which is relatively inexpensive and efficient and will allow the cutting edge to be maintained without deterioration during a relatively great number of cutting operations.

It has heretofore been a practice in the art of pipe and tube cutting, to place the pipe or tube upon a pair of idler rollers which are placed close enough together so that the pipe or tube will rest on the cylindrical surface of each roller. To perform the cutting operation a cutting disc has been placed above the pipe to be cut and power has been applied to the cutter to rotate it with its cutting edge against the pipe. The rotation of the cutter correspondingly rotates the pipe or tube being cut together with the idler members on which it rests; and during the rotation the cutting edge cuts around the circumference of the pipe or tube until it is severed.

While the arrangement just described will effectively cut a pipe or tubing or the like, it has the disadvantage that when the power is applied to the cutter, a considerable amount of power is required in order to both rotate and produce the cutting operation. Furthermore, it has the further disadvantage that it is not very convenient to mount the power motor on the movable frame structure on which the cutter is placed. Moreover, owing to the fact that the cutting edge is performing both the rotating and the cutting operations, a more ragged cut is obtained than otherwise, and there is considerable wear and tear on the cutting edge.

In accordance with my present invention, I overcome the disadvantages of such prior types of cutting machines by powering the rollers on which the pipe or tube to be cut is rested, and allowing the cutting disc or wheel to idle. By doing this, I have succeeded in simplifying the construction of the machine, while enabling it to perform more effective cutting with less power. A feature of my arrangement resides in mounting the power motor on the frame with the rollers and coupling the rollers directly with the motor. The cutter is in the form of a disc with a sharp cutting edge mounted on a movable frame above the powered rollers. The cutting disc idles on its shaft or pin so that it is not in rotary motion until it is brought down on the work to be cut. The work being cut is rotated by the powered rollers on which it rests, which causes the cutter to rotate on the work and thus to produce the cutting operation without the application of power to the cutter.

The foregoing and other features of my invention will be better understood from the following detailed description and the accompanying drawings of which:

Fig. 1 is a front elevation view of a cutting machine in accordance with my invention;

Fig. 2 is a side elevation of the machine;

Fig. 3 is a cross-section view taken at line 3—3 of Fig. 2; and

Fig. 4 is a partial view showing a detail in cross-section taken at line 4—4 of Fig. 2.

Referring to the drawings, the machine is built on a frame 1 ordinarily of a rigid metal such as iron. On the frame is mounted a housing 2 having a pair of opposite side walls 3 and 3a, respectively, a front wall 4 and a rear wall 5. Supported within the housing is a pair of bearings 6 and 7, placed side-by-side in back of the front wall; and the rear wall is provided with a pair of similar bearings located opposite the respective bearings 6 and 7. A pair of shafts 8 and 9 are journaled through the respective opposite pairs of bearings in the front and rear walls, and there is fastened to each shaft a cylindrical roller, the two rollers being numbered 10 and 11 respectively. The parallel shafts and the rollers are so spaced apart that the cylindrical walls of the rollers do not quite touch each other, as shown in Figs. 1 and 3. To accommodate the rollers, the side walls of the housing have cut-outs as shown by the cut-out 12 in wall 3. The remainder of the two side walls which are not at the cut-out section are covered by roof housing members 13 and 14 respectively, secured in place by respective bolts 15, and these roof members serve to hold the respective front and rear bearings in place against corresponding bearing supports (not shown) mounted on the walls 3 and 3a.

For the purpose of driving the rollers, each of the shafts 8 and 9 is provided with a spiral gear these being numbered 16 and 17 respectively; and these gears mesh with respective spiral gears 18 and 19, fastened on a shaft 20 journaled in ball bearings 21 and 22 through the sides of the housing.

The shaft 20 is an extension of the armature shaft of an electric motor 23 mounted on the frame. Rotation of the motor shaft 20 by the motor thereby rotates the roller shafts 8 and 9 in the same direction so that the adjacent cylindrical surfaces of the two rollers move in opposite directions relative to each other as shown by the two arrows in Figs. 1 and 3.

Alongside the electric motor there is provided a yoke 24 which is fastened to the base at a footing 25 at one side of the motor and at the other side of the motor is bolted by a bolt 26 set in a recess 27 to a leg 28 which is likewise securely fastened to the frame. The yoke or support 24 is bifurcated at the top to allow space for the end of a heavy arm or lever 29 between the bifurcations, and the lever is pivoted to the bifurcation by a pivot pin 30. The arm or lever 29 is constructed with a concave top member 31 which extends forwardly from the pivot to the front portion which curves downwardly so that the lever is in the form of a housing open underneath and enclosed by the top 31, the forward portion 32 and respective side portions 33 and 34.

Within the lever arm housing and near its front end there is provided a shaft 35 which is journaled in bushing 36 and 37 fastened to the respective sides 33 and 34 of the housing so that the shaft or spindle is free to rotate within its bushings. Attached to the shaft there is a cutting wheel 38 having a cutting edge 39, and this cutter is located above the rollers 10 and 11 as indicated in Figs. 1 and 2.

By this arrangement, the work piece to be cut, which may be a length of pipe or tubing 40 (Fig. 1) may be placed to rest on the rollers 10 and 11 with the cutting wheel directly over the work piece, so that the turning of the rollers by the power of the motor will correspondingly turn the pipe or tubing. Then when the cutting wheel is brought down on the top of the tubing with some pressure, the cutter will be turned by the turning of the pipe and will cut into the pipe and shear it off.

For the purpose of bringing down the cutting wheel against the work piece, there is provided a rack and pinion arrangement comprising a rack 41 and a pinion 42 mounted on the lever arm. To attach the pinion 42 there is provided a lug 43 integral with a web 44 extending across the lever arm 29; and a pin 45 is attached to the lug 43 on which the pinion is keyed or otherwise suitably fastened. A wheel 46 is attached to the outer extremity of shaft 45, and this wheel is provided with a number of radially extending bores 47 spaced around the circumference. The bores are adapted to receive the end of a lever rod 48 for turning the wheel. Thus, when the lever 48 is inserted in one of the bores, the operator may pull down on the lever, thereby turning the pinion shaft and the pinion 42, so that the pinion moves down the rack and pulls the lever arm 29 downwardly to press the cutting wheel 38 against the work piece to be cut.

The rack member is constructed to operate as an automatic switch for turning on the motor whenever the lever arm 48 is operated to pull the cutter down against the work piece. This construction comprises a lug 49 protruding outwardly from the side wall 3a of the roller housing; and there is firmly secured to the lug 49 a pin 50, which protrudes through a hole 51 in the rack. The hole 51 is elongated relative to the pin so that the rack may undergo some relative motion in a vertical direction with respect to the pin. In order to hold the rack normally in its most downward position on the pin, there is provided a compression spring 52, the upper end of which is rested against the pin, and the lower end of which is rested against a shoulder 53 at the base of the vertical slot 54 of the rack in which the spring is set. At the bottom of the rack there is attached a rod 55 which protrudes into a switch box 56 and operates on the switch contact.

The switch may be of a conventional type such as a micro-switch having a movable switch arm with a contact member adapted to establish contact with another contact member to close the circuit through electrical leads 57 and 58. Since such switches are well known, no further detailed description will be given here. It will suffice to state that the arrangement is such that when the rack 41 is pulled upwardly relative to pin 50, it will move the switch contacts into contact with each other to turn on the power to the motor to start the motor. But when the rack is in its normal down position, the contacts are open so that the motor will not run. Thus, the motor is started by the operator pulling down on the operating lever 48 to press the cutting wheel against the piece being cut. The operation of the pinion on the rack under this condition will be to lift the rack against the compression of the spring to turn on the switch and start the motor.

In order to hold the rack against the pinion there is provided a roller 59 suitably attached to the frame.

It is desirable to provide an oiling system for the gears in the housing 2 since the gears are subjected to considerable torque. The oiling means comprises a spindle on shaft 60 rotatable within a journal 61 formed at the end of a leaf spring member 62 fastened within the housing by suitable means such as a screw 62a. There is attached at each end of the spindle 60 an oil ring or disc, these being numbered 63 and 64 respectively; and they are held against the teeth of respective gears 18 and 19 by action of the spring. According to a common practice, the oil discs may be made of a suitable felt or other material adapted to absorb oil from the oil well space 65 within the housing, and to carry the oil up to the gear wheels 18 and 19. Oil may be admitted to the oil well through the oil inlet opening 66 (see Fig. 1). With this arrangement, oil can be poured into the inlet until it comes to the top of the opening and will take no more oil.

In operation, the operator will place the pipe or tube which is numbered 40, and which is to be cut, in its position on the rollers as shown in Fig. 1, and then pull down on the lever 48 until enough pressure is exerted to raise the rack 41 against the tension of the spring. This will start the motor to rotate the rollers 10 and 11, thereby rotating the work piece and the cutting wheel 38. After sufficient rotations in this manner, the cutter will cut through the pipe or tube.

By my invention I have provided an extremely efficient and simple tool for cutting hollow cylindrical members such as pipe or the like, whereby the power is readily applied to the power rollers because the power motor is mounted on the same base as the roller shafts. This results in a simplification of the arrangement because it makes it unnecessary to mount any power motor on the movable lever arm containing the cutting disc. By the arrangement, the power is directly conveyed to the pipe to be cut through at the rollers on which it rests and the arm containing the cutter disc may be very simply constructed. Owing to the fact that no power is applied through the cutter disc itself, since the cutter disc is merely an idler, it will perform a clean cut and with relatively little wear of the cutting edge.

Modifications of my invention may, of course, suggest themselves to those skilled in the art and the invention should not be limited except in accordance with the scope of the appended claims.

I claim:

1. A cutter for cutting a hollow cylindrical member comprising a pair of parallel cylindrical rollers spaced side by side in proximity to each other so that the cylindrical member can be rested on both rollers, a power motor coupled with the rollers to rotate them in the same direction and thereby rotate the cylindrical member, a movable arm in operating relation above the rollers, a freely rotatable disc cutter mounted on the arm and adapted to make contact with the cylindrical member when the arm is pulled downward, so that the axes of the disc cutter and of the rollers are parallel, a rotatable pinion attached to the arm, and an upstanding rack mounted in relation to the rollers, the teeth of the pinion engaging the teeth of the rack, and means for rotating the pinion on the rack to force the arm down and thereby force the edge of the disc cutter into cutting contact with the cylindrical member.

2. A cutter according to claim 1 in which the power motor is provided with a starting switch having an operating arm, and the upstanding rack is attached to the switch arm so that when a pull is applied to the rack by turning of the pinion, the starting motor will start, thereby turning the rollers.

3. A cutter according to claim 2 in which the rack is connected with the switch arm through a spring.

4. A cutting tool for cutting a hollow cylindrical member, comprising a housing, a pair of horizontal parallel shafts journaled within the housing, a roller fastened to each shaft and spaced in proximity to each other, the housing being provided with cut-out portions to expose the upper portions of the rollers, power means for rotating the shafts in the same direction and thereby rotating the cylindrical member placed on the rollers, a movable arm in operating relation over the tops of the rollers, a disc cutter mounted on the arm and freely rotatable about a horizontal axis parallel to the axis of said rollers, so that the cutter is adapted to make contact with the top of the cylindrical member when the arm is brought down, said shafts being provided with gears within the housing which are geared to the power means, an oil well provided within the housing, and oil rings mounted within the housing in contact with the gears to dip into the oil well and carry the oil to the gears.

LOUIS QUIJADA.

REFERENCES CITED

The following references are of record in the file of this patent:

UNITED STATES PATENTS

| Number | Name | Date |
|---|---|---|
| 1,042,998 | Blackmore | Oct. 29, 1912 |
| 1,765,208 | Cunningham | June 17, 1930 |
| 1,922,426 | Fahrney | Aug. 15, 1933 |